(12) United States Patent
Demasi et al.

(10) Patent No.: US 8,756,700 B2
(45) Date of Patent: *Jun. 17, 2014

(54) CUSTOM DATA IMAGE BUILDING

(75) Inventors: Rocco P. Demasi, Nanuet, NY (US); Robert T. Milne, Redington Shores, FL (US); Ronald L. Bland, Celina, TX (US); Jason M. Iannelli, Township of Washington, NJ (US); Arthur A. Tarricone, Jr., Ellicot City, MD (US); Andrew L. Herman, Columbia, MD (US); William G. Umberger, Clifford Township, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/603,016

(22) Filed: Sep. 4, 2012

(65) Prior Publication Data

US 2012/0331531 A1 Dec. 27, 2012

Related U.S. Application Data

(63) Continuation-in-part of application No. 12/015,242, filed on Jan. 16, 2008, now Pat. No. 8,291,406.

(51) Int. Cl.
*H04L 9/32* (2006.01)

(52) U.S. Cl.
USPC ............................................. 726/26; 726/27

(58) Field of Classification Search
USPC .............. 726/1–5, 26–30; 713/168–170, 191; 717/168–178
See application file for complete search history.

(56) References Cited

U.S. PATENT DOCUMENTS

| | | | |
|---|---|---|---|
| 5,325,532 A * | 6/1994 | Crosswy et al. ................... | 713/2 |
| 5,802,278 A | 9/1998 | Isfeld et al. | |
| 6,425,126 B1 * | 7/2002 | Branson et al. ............... | 717/168 |
| 6,567,860 B1 | 5/2003 | Maxwell et al. | |
| 6,678,888 B1 | 1/2004 | Sakanishi | |
| 6,763,517 B2 * | 7/2004 | Hines ........................... | 717/124 |
| 6,964,034 B1 | 11/2005 | Snow | |
| 7,024,471 B2 | 4/2006 | George et al. | |
| 7,458,073 B1 | 11/2008 | Darling et al. | |
| 7,565,649 B2 | 7/2009 | Sasabe | |
| 7,644,414 B2 | 1/2010 | Smith et al. | |
| 7,676,448 B2 | 3/2010 | Henderson et al. | |
| 7,805,719 B2 | 9/2010 | O'Neill | |
| 7,913,246 B2 | 3/2011 | Hammond et al. | |
| 8,055,907 B2 * | 11/2011 | Deem et al. .................... | 713/187 |
| 8,291,406 B2 * | 10/2012 | Milne et al. ................... | 717/171 |
| 2005/0144186 A1 | 6/2005 | Hesselink et al. | |

(Continued)

*Primary Examiner* — Hosuk Song

(57) ABSTRACT

A first server is configured to receive an image from a first client device. The image may include an instruction to provide a second client device with a computer file. The first server is further configured to store the image, receive a task query from the first client device, and provide a task query response to the first client device based on receiving the task query. The task query response may include an indication that the first server is storing a task associated with the second client device. The first server is further configured to receive an image request from the second client device, communicate with a second server to identify whether the second client device is authorized to receive the image, and provide, to the second client device, the computer file associated with the image based on identifying that the second client device is authorized to receive the image.

23 Claims, 7 Drawing Sheets

(56) References Cited

U.S. PATENT DOCUMENTS

| | | |
|---|---|---|
| 2005/0144616 A1 | 6/2005 | Hammond et al. |
| 2005/0210459 A1 | 9/2005 | Henderson et al. |
| 2006/0130037 A1 | 6/2006 | Mackay |
| 2006/0212673 A1 | 9/2006 | Fukuguchi et al. |
| 2007/0174351 A1 | 7/2007 | Liu et al. |
| 2007/0245409 A1 | 10/2007 | Harris et al. |
| 2007/0288710 A1 | 12/2007 | Boyd et al. |
| 2007/0300311 A1 | 12/2007 | Hirano et al. |
| 2008/0049779 A1 | 2/2008 | Hopmann et al. |
| 2008/0056253 A1 | 3/2008 | Minami et al. |
| 2009/0125627 A1 | 5/2009 | Ford |
| 2009/0125679 A1 | 5/2009 | Takeuchi |

* cited by examiner

CUSTOM DATA IMAGE BUILDING

RELATED APPLICATION

This application is a continuation-in-part of U.S. patent application Ser. No. 12/015,242, filed on Jan. 16, 2008. The entire content of U.S. patent application Ser. No. 12/015,242 is incorporated herein by reference.

BACKGROUND

Data images are sometimes used to install operating systems, software applications, or some other computer file on a client device, such as a desktop computer. Users of a client device sometimes build a data image, store the data image on a storage medium (e.g., a physical compact disk (CD)), and provide the data image to a client device in the form of a physical CD. A software application, associated with the client device, may read the data image to install operating systems, software applications, or some other computer file on the client device. Building a data image for storing on a compact disk and providing the compact disk to a client device is time consuming and can result in out-of-date applications being provided to the client device.

DETAILED DESCRIPTION OF THE PREFERRED EMBODIMENTS

The following detailed description refers to the accompanying drawings. The same reference numbers in different drawings may identify the same or similar elements.

Systems and/or methods, described herein, may allow a user to build an image via a user interface (e.g., a web-based user interface, a software-based user interface, etc.) associated with a client device. In some implementations, the image may include instructions to provide and/or install a particular software application, provide and/or install a particular operating system, and/or provide and/or install some other computer file to a particular client device (e.g., the client device used to build the image or some other client device or group of client devices) at a particular time.

In some implementations, the computer files (e.g., software applications, driver files, and/or some other computer file), associated with the image, may be stored by a middle tier server which may automatically update the computer files that a user may select when building an image. As a result, a user may use a client device to build an image without the client device storing the computer files (referred to herein after as "file" or "files") associated with the image. Further, the image may be associated with files stored by the middle tier server, thereby ensuring that the files are up to date.

In some implementations, a client device may provide a file to the middle tier server. The middle tier server may store the file based on identifying that the file is not currently being stored by the middle tier server or based on determining that an outdated version of the file is being stored by the middle tier server. As a result, the middle tier server may store up-to-date files and may not store multiple instances of the same files, thereby saving storage space on the middle tier server.

In some implementations, a backend server may store authentication information regarding the image, such that only authorized users of the image may access the image (e.g., edit the image, execute the instructions associated with the image, etc.). Additionally, or alternatively, the backend server may store information to identify files that the middle tier server may provide to a client device associated with a particular image.

In some implementations, a client device, associated with the image, may receive the image via the backend server and/or the middle tier server, and may communicate with the backend server and/or a middle tier server to install software applications, install operating systems, and/or receive some other files associated with the image. As a result, the client device may receive up-to-date files associated with the image.

Figure 1:
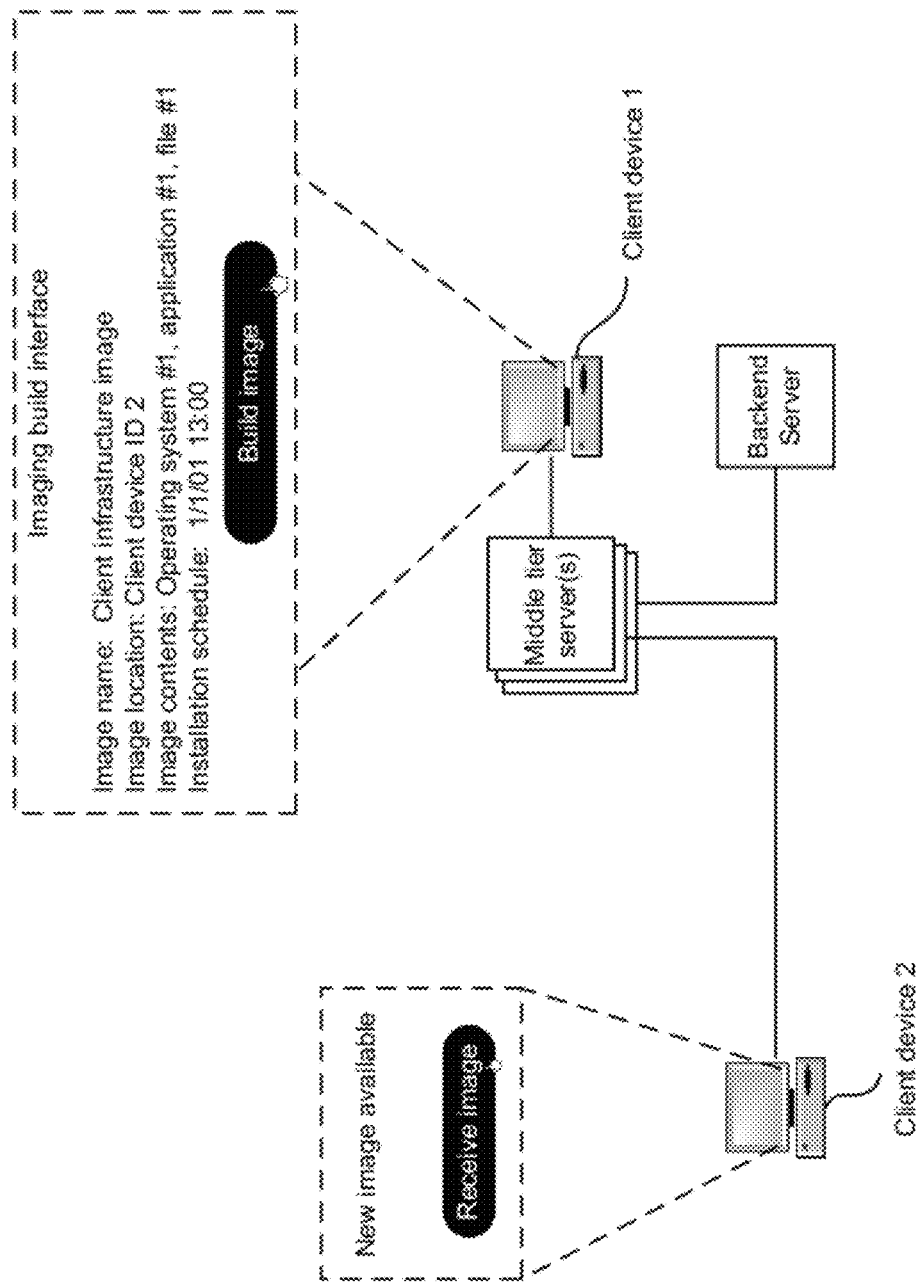
FIG. 1 illustrates an example overview of an implementation described herein.

FIG. 1 illustrates an example overview of an implementation described herein. In FIG. 1, assume that a user provides information to a first client device (e.g. client device 1) to build an image (e.g., via a user interface of client device 1). As shown in FIG. 1, client device 1 may receive information regarding an image name (e.g., a narrative description of the image), an image location (e.g., an identifier of a second client device (e.g., client device 2) to receive the image), selection of image contents (e.g., an operating system, a software application, and/or some other file), and/or an installation schedule (e.g., a time in which the second client device may receive and/or install the image contents). Additionally, or alternatively, client device 1 may receive some other information regarding an image. As further shown in FIG. 1, client device 1 may build the image based on receiving the information regarding the image (e.g., image name, image location, image contents, installation schedule, etc.) and based on receiving an instruction to build an image.

As further shown in FIG. 1, a middle tier server (or multiple middle tier servers), may receive the image and may store a task, associated with the image, in a task repository. Client device 2 may communicate with the middle tier and may identify that the middle tier server(s) stores an image associated with client device 2, based on information in the task repository. Based on identifying the image, client device 2 may communicate with the middle tier server(s) to receive the image and/or the files associated with the image. In some implementations, the middle tier server(s) may communicate with a backend server to identify whether client device 2 is authorized to receive the image, and to identify the files that the middle tier server(s) may provide to a client device associated with a particular image. Additionally, or alternatively, the middle tier server(s) may communicate with the backend server to identify policies associated with the image (e.g., policies relating to installation procedures for files, policies relating to from which middle tier server client device 2 may receive files, etc.).

As a result, client device 1 may build an image for client device 2 without client device 1 storing the files associated with the image, and client device 2 may receive the image and/or the files, associated with the image, via the middle tier and/or backend servers. Further, the files may be stored by a central repository, associated with the middle tier server(s), thereby ensuring that the files, associated with the image, are up to date.

Figure 2:
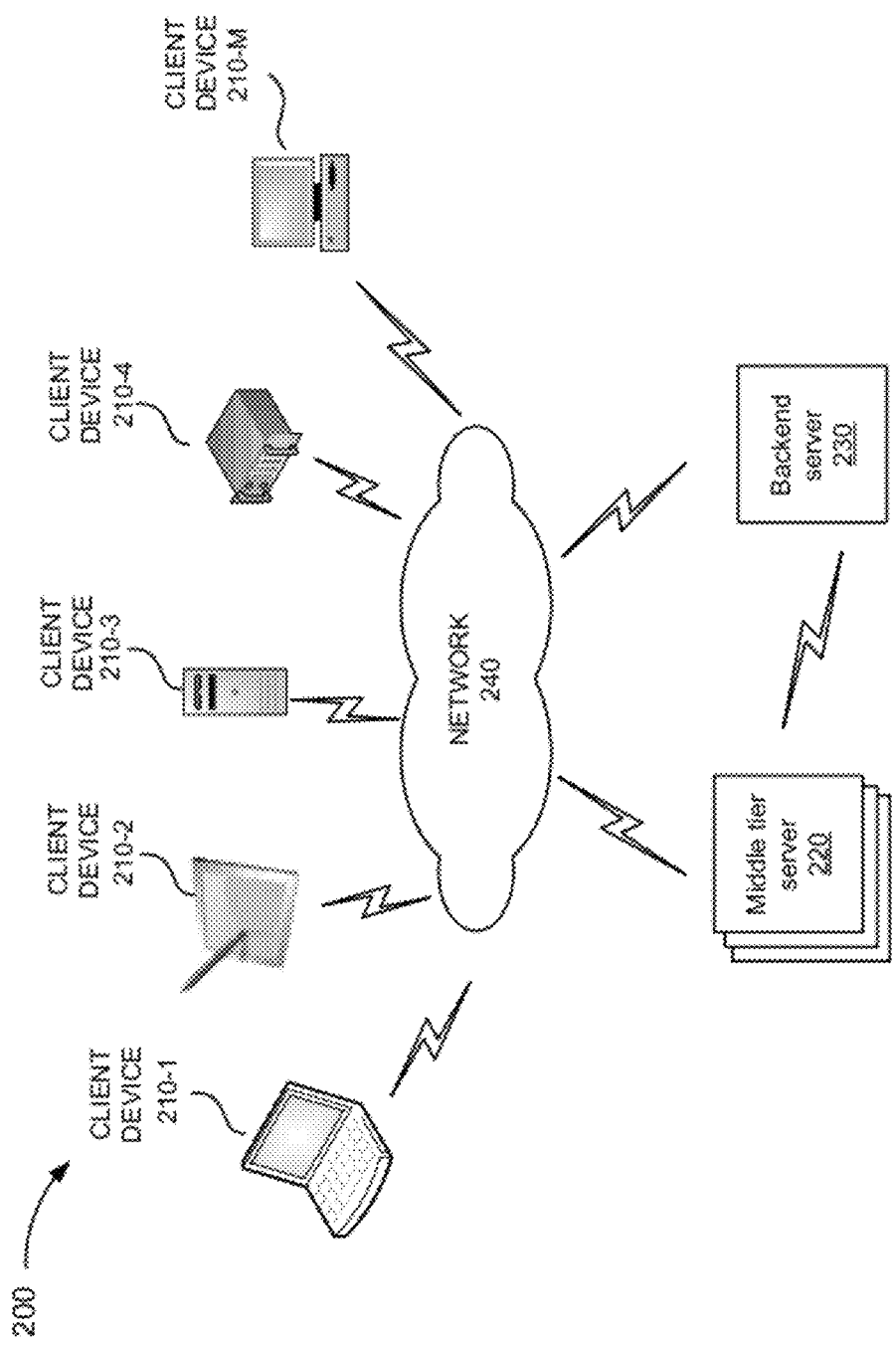
FIG. 2 illustrates an example environment in which systems and/or methods, described herein, may be implemented.

FIG. 2 is a diagram that illustrates an example environment 200 in which systems and/or methods, described herein, may be implemented. As shown in FIG. 2, environment 200 may include client devices 210-1, 210-2, ..., 210-M (where M≥1) (collectively referred to as "client devices 210," and individually as "client device 210"), middle tier servers 220, backend server 230, and network 240. While FIG. 2 shows a particular quantity and arrangement of devices, in practice, environment 200 may include additional devices, fewer devices, different devices, or differently arranged devices than are shown in FIG. 2. For example, each of middle tier servers 220 and backend server 230 may be implemented as multiple, possibly distributed, devices. Alternatively, middle tier server 220 and backend server 230 may be implemented within a single device. Further, a function described as being performed by one device may be performed by another device.

Client device 210 may include any device capable of communicating via a network, such as network 240. For example, client device 210 may correspond to a computing device, such as a desktop computing device, a rack-mountable server device, a mobile computing device (e.g., a smart phone or a personal digital assistant (PDA)), a portable computing device (e.g., a laptop or a tablet computer), and/or some other type of device. In some implementations, client device 210 may receive information to build an image, such as an image name, an image location, image contents, an installation schedule, and/or some other information. In some implementations, client device 210 may receive the information via a web-based user interface, a software application, and/or via some other technique. Client device 210 may build the image based on the information to build an image and may provide the image to middle tier server 220. In some implementations, client device 210 may include integrated access control to allow multiple images to be built at the same time. Additionally, or alternatively, client device 210 may provide files to middle tier server 220, such that middle tier server 220 may store and maintain up-to-date files and such that client device 210 (e.g., the client device 210 that provided the files to middle tier server 220 or some other client device 210 in environment 200) may receive the files associated with an image.

In some implementations a first client device 210 may function as a master client device 210 (e.g., client device 210-1) for a second client device 210 (e.g., client device 210-2) or group of client devices 210 within a subnet. Client device 210-1 may communicate with middle tier server 220 to identify images stored by middle tier server 220 associated with client device 210-2. Client device 210-2 may communicate with middle tier server 220 to receive the image based on receiving an indication from the client device 210-1 that middle tier server 220 is storing an image associated with client device 210-2. Additionally, or alternatively, client device 210-1 may send a wake instruction to client device 210-2 when middle tier server 220 is storing an image associated with client device 210-2 and when client device 210-2 has gone into an idle state. As a result, network traffic may be reduced by causing only master client devices 210 to communicate with middle tier server 220 rather than all client devices 210 communicating with middle tier server 220.

In some implementations, client device 210 may function as an administrative client device 210 to set a parameter (e.g., a throttling parameter, or some other parameter) for middle tier server 220. For example, client device 210 may instruct middle tier server 220 to provide ten megabits per second (Mbps) of total bandwidth across multiple client devices 210, or may instruct middle tier server 220 to provide some other amount of bandwidth across a particular group of devices in environment 200 (e.g., a subnet of client devices 210 or a group of client devices 210 associated with a site).

In some implementations, client device 210 may include network load checking capabilities to prevent network overload. For example, as described above, client device 210 may receive an image from middle tier server 220. Transmission of the image may include a demand for network resources, such as bandwidth, and/or some other network resource. Client device 210 may identify whether the devices in environment 200 include sufficient network resources to allow client device 210 to receive the image and/or the files associated with the image.

Middle tier server 220 may include a server device, or a collection of server devices. In some implementations, middle tier server 220 may store files which may be included in an image or may be used for some other purpose. Middle tier server 220 may maintain the files in a file repository, such that the files are up to date and such that multiple instances of the files may not be stored, thereby saving storage space on middle tier server 220. Additionally, or alternatively, middle tier server 220 may receive an image from client device 210 and may store a task, associated with the image, in a task repository. Middle tier server 220 may provide files, associated with an image, to client device 210 based on information regarding the image and based on information stored by backend server 230 (e.g., authentication information, installation parameters, etc.)

In some implementations middle tier server 220 may receive a file from client device 210. Middle tier server 220 may identify whether the file is up to date, and may identify if the file is already being stored by middle tier server 220. As a result, middle tier server 220 may store up-to-date files and may not store multiple instances of the same files, thereby saving storage space on middle tier server 220-1. For example, assume that a first middle tier server 220 (e.g., middle tier server 220-1) receives a file from client device 210. Middle tier server 220-1 may store the file based on identifying that the file is not currently being stored by middle tier server 220-1 or based on identifying that the file has a more recent version number than the file being stored by middle tier server 220. In some implementations, a second middle tier server 220 (e.g., middle tier server 220-2) may communicate with middle tier server 220-1 at regular intervals (e.g., at a 5, 10, 20, 30 second interval, or some other interval) to detect when middle tier server 220-1 receives and stores a file. Middle tier server 220-2 may receive the file from middle tier server 220-1 such that middle tier server 220-1 and middle tier server 220-2 each have the same up-to-date file.

In some implementations, middle tier server 220 may store files and/or images in different repositories (or different portions of a repository), such as a private repository, a public repository, a testing repository, and/or some other repository. As such, a user may easily identify files and/or images which may be in different stages of development, and middle tier server 220 may publish files stored by a particular repository such that other middle tier servers 220 may receive published files.

In some implementations, a first middle tier server 220 (e.g., middle tier server 220-1) may function as a master middle tier server 220 for a second middle tier server 220 (e.g., middle tier server 220-2) or a group of middle tier servers 220. Middle tier server 220-1 may receive a performance indication from middle tier server 220-2 that middle tier server 220-2 is performing properly (e.g., a ping check, or some other indication) at regular intervals (e.g., at a 5, 10, 20, 30 second interval, or some other interval). Middle tier server 220-1 may automatically redirect network traffic from middle tier server 220-2 to a third middle tier server 220 (e.g., middle tier server 220-3) based on not receiving the performance indication from middle tier server 220-2.

In some implementations, middle tier server 220 may function as a web server to store and/or serve a web page used to build an image. For example, client device 210 may build an image via a web page stored by middle tier server 220.

Backend server 230 may include a server device, or a collection of server devices. In some implementations backend server 230 may store authentication information for an image such that only authorized client devices 210 may access the image (e.g., receive the image, modify the image, access information regarding the image, etc.). Additionally, or alternatively, backend server 230 may store policies for an image, such as policies relating to installation procedures, policies to identify files associated with an image, and/or policies relating to some other information associated with the image. In some implementations, backend server 230 may include a built in redundancy such that if a particular backend server 230 fails, another backend server 230 may be enabled to receive network traffic associated with authentication information and/or installation parameters for an image. In some implementations, middle tier server 220 may connect with backend server 230 via a direct connection (e.g., in an implementation where client device 210 may not communicate directly with backend server 230 to secure backend server 230).

Network 240 may include any type of network or a combination of networks. For example, network 240 may include a local area network (LAN), a wireless LAN (WLAN), a wide area network (WAN) (e.g., the Internet), a metropolitan area network (MAN), an ad hoc network, a telephone network (e.g., a Public Switched Telephone Network (PSTN), a cellular network, or a voice-over-IP (VoIP) network), a fiber optic network, or a combination of networks. Each of client device 210, middle tier server 220, and/or backend server 230 may connect to network 240 via a wireless connection, a wired connection, or a combination thereof.

In some implementations, client device 210, middle tier server 220, and backend server 230 may communicate via network 240 using the hypertext transfer protocol (HTTP), HTTP secure (HTTPS) protocol, and/or some other type of protocol. Additionally, or alternatively, client device 210, middle tier server 220, and backend server 230 may communicate via a specific port, such as port 80, port 447, and/or some other port.

Figure 3:
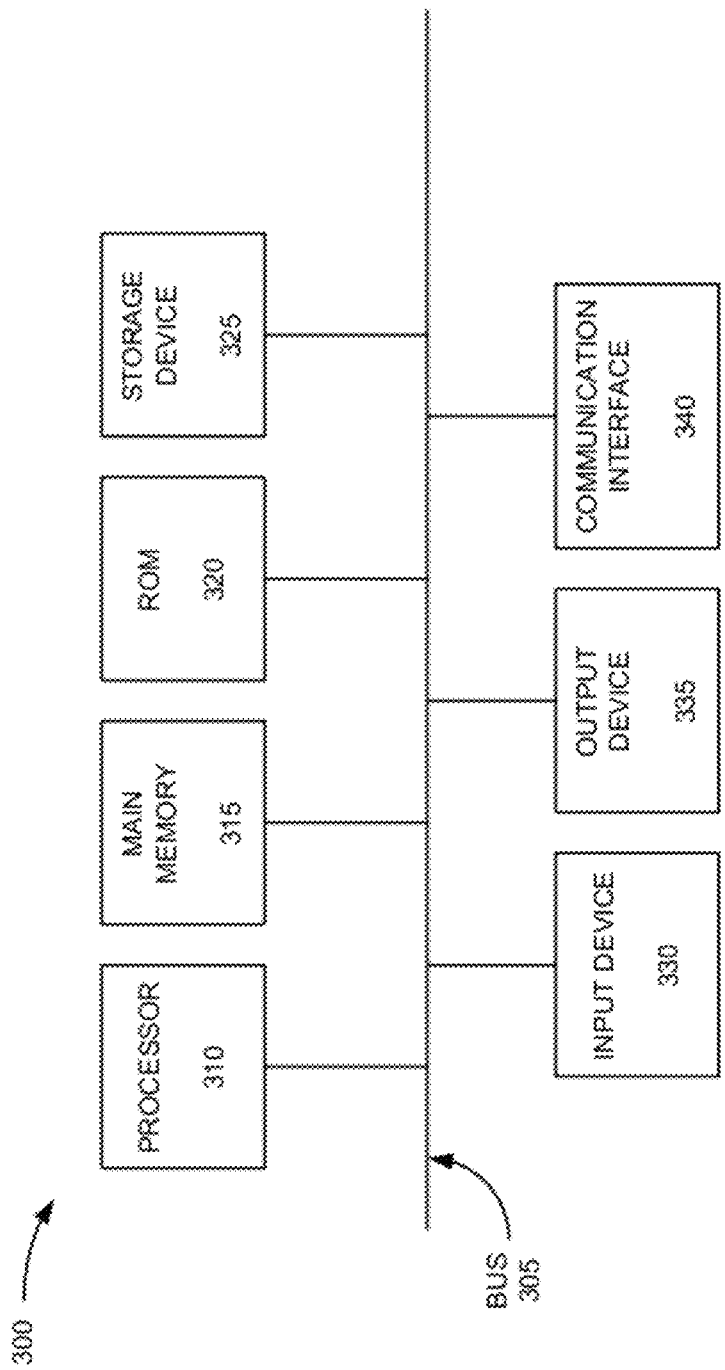
FIG. 3 illustrates example components of a device that may be used within the environment of FIG. 2.

FIG. 3 illustrates example components of a device 300 that may be used within environment 200 of FIG. 2. Device 300 may correspond to client device 210, middle tier server 220, and/or backend server 230. Each of client device 210, middle tier server 220, and/or backend server 230 may include one or more devices 300, and/or one or more components of device 300.

As shown in FIG. 3, device 300 may include a bus 305, a processor 310, a main memory 315, a read only memory (ROM) 320, a storage device 325 (also referred to as a local storage device or local storage), an input device 330, an output device 335, and a communication interface 340. In some implementations, device 300 may include additional components, fewer components, different components, or differently arranged components.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a mechanism that permits an operator to input information to device 300, such as a control button, a keyboard, a keypad, or another type of input device. Output device 335 may include a mechanism that outputs information to the operator, such as a light emitting diode (LED), a display, or another type of output device. Communication interface 340 may include any transceiver-like mechanism that enables device 300 to communicate with other devices or networks. In one implementation, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include space within a single physical storage device or spread across multiple physical storage devices.

The software instructions may be read into main memory 315 from another computer-readable medium, such as storage device 325, or from another device via communication interface 340. The software instructions contained in main memory 315 may cause processor 310 to perform processes that will be described later. Alternatively, hardwired circuitry may be used in place of or in combination with software instructions to implement processes described herein. Thus, implementations described herein are not limited to any specific combination of hardware circuitry and software.

Figure 4:
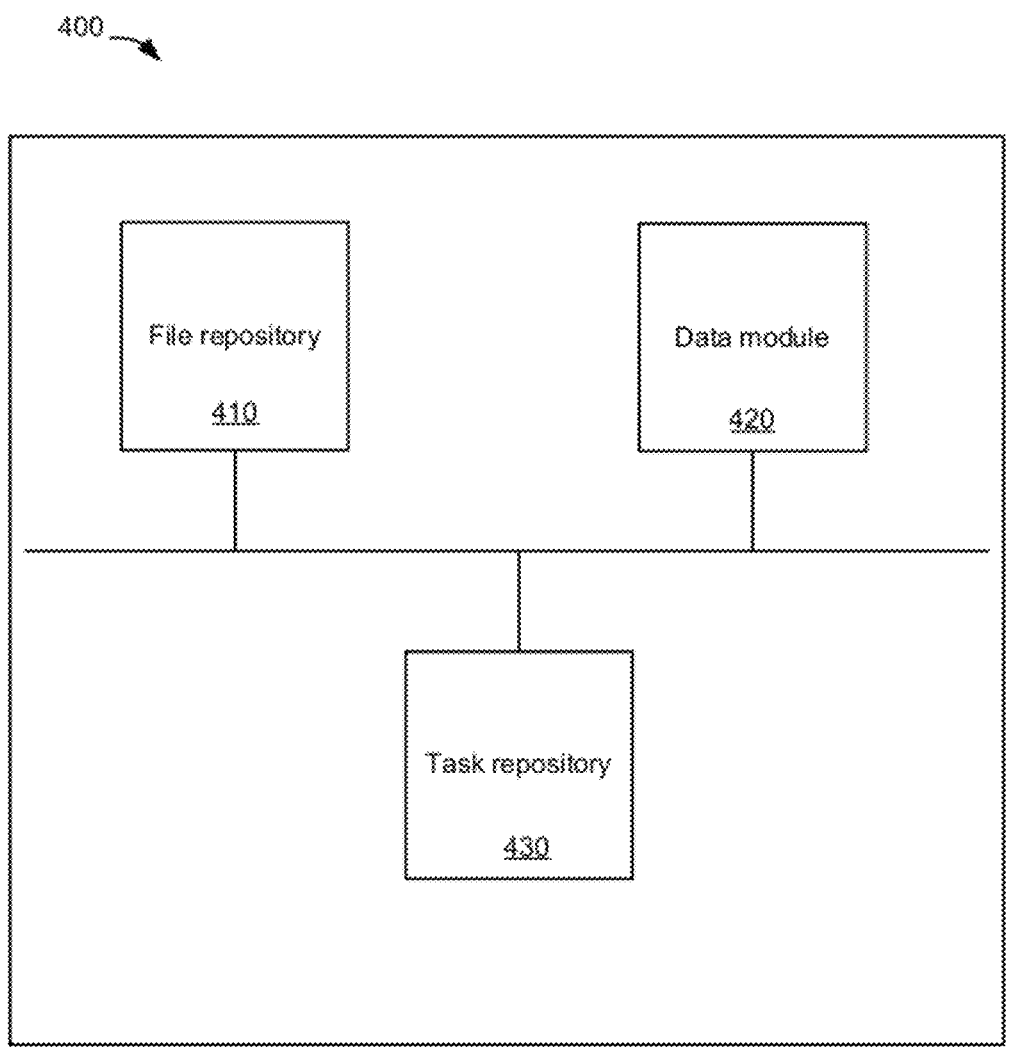
FIG. 4 illustrates example functional components of an example system.

FIG. 4 illustrates example functional components of an example system 400. In some implementations, system 400 may include functional components implemented by a device, such as middle tier server 220. In some other implementations, system 400 may include functional components implemented by one or more devices, which include or exclude middle tier server 220. For example, client device 210 and/or backend server 230 may include some or all of the functional components of system 400.

As shown in FIG. 4, system 400 may include file repository 410, data module 420, and task repository 430.

In some implementations, file repository 410 may receive and/or store a file from client device 210, middle tier server 220, and/or backend server 230. File repository 410 may store the file such that client device 210 may receive the file associated with an image. Additionally, or alternatively, file repository 410 may store the file based on identifying that the file is not currently being stored by file repository 410 or based on identifying that an outdated version of the file is being stored by file repository 410 (e.g., based on a version number, a hash value, a timestamp, etc.). In some implementations, file repository 410 may communicate with middle tier server 220 at regular intervals (e.g., at a 5, 10, 20, 30 second interval, or some other interval) to detect when middle tier server 220 receives and stores a file. File repository 410 may receive the file such that file repository 410 and middle tier server 220 each have the same up-to-date file. In some implementations, file repository 410 may provide the file to client device 210 based on an image associated with client device 210 and based on information stored by backend server 230 (e.g., an installation procedure stored by backend server 230 that directs file repository 410 to provide the file to client device 210 based on information stored by the image).

Data module 420 may store activity data associated with middle tier server 220, such as information regarding files received, images received, files provided to client device 210, and/or ping responses sent to a master middle tier server 220 (e.g., in the context of providing the master middle tier server 220 with indications that middle tier server 220 is functioning properly). In some implementations, network functionality and system health may be determined based on information stored by data module 420.

Task repository 430 may receive and/or store a task associated with an image built by client device 210. For example, as described above, client device 210 may build an image which may include instructions to direct client device 210 (e.g., the client device 210 used to build the image or some other client device 210 or group of client devices 210) to install a particular software application, install a particular operating system, and/or receive some other file. In some implementations, task repository 430 may communicate with a master client device 210 to identify client devices 210 within a subnet of master client device 210 having tasks stored by task repository 430. For example, assume that the master client device 210 (e.g., client device 210-1) identifies that task repository 430 is storing a task associated with a particular client device 210 (e.g., client device 210-2) within the same subnet of client device 210-1. Client device 210-2 may communicate with middle tier server 220 to receive an image, associated with a task, based on task repository 430 providing an indication to client device 210-1 that task repository 430 is storing a task associated with client device 210-2.

Figure 5:
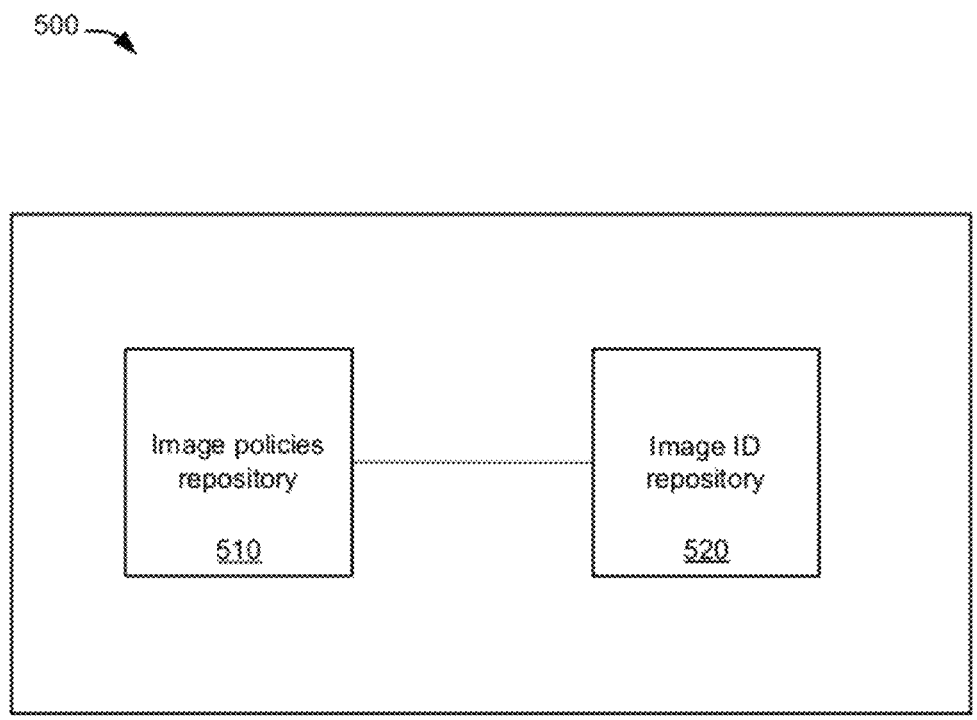
FIG. 5 illustrates example functional components of an example system.

FIG. 5 illustrates example functional components of an example system 500. In some implementations, system 500 may include functional components implemented by a device, such as backend server 230. In some other implementations, system 500 may include functional components implemented by one or more devices, which include or exclude backend server 230. For example, client device 210 and/or middle tier server 220 may include some or all of the functional components of system 500.

As shown in FIG. 5, system 500 may include image policies repository 510 and image ID repository 520.

Image policies repository 510 may store policies associated with an image or policies associated with particular components of an image (e.g., particular software components, particular files, etc.). In some implementations, image policies repository 510 may store installation policies, download policies (e.g., policies to direct client device 210 to receive files from a particular middle tier servers 220), and/or some other policies associated with an image. Additionally, or alternatively, image policies repository 510 may include translation functions to identify components and/or files associated with an image. In some implementations, client device 210 may receive files and/or install files in a manner in accordance with information stored by image policies repository 510.

Image ID repository 520 may store information to identify authentication information for an image. In some implementations, client device 210 may access an image (e.g., receive an image, receive and/or install files associated with an image, modify an image, etc.) based on information stored by image ID repository 520. In one example implementation, image ID repository 520 may store an image identifier (such as a number or some other identifier) and may store information regarding an authorized client device 210 for the image (e.g., a username and/or password, hardware data of client device 210, etc.).

Figure 6:
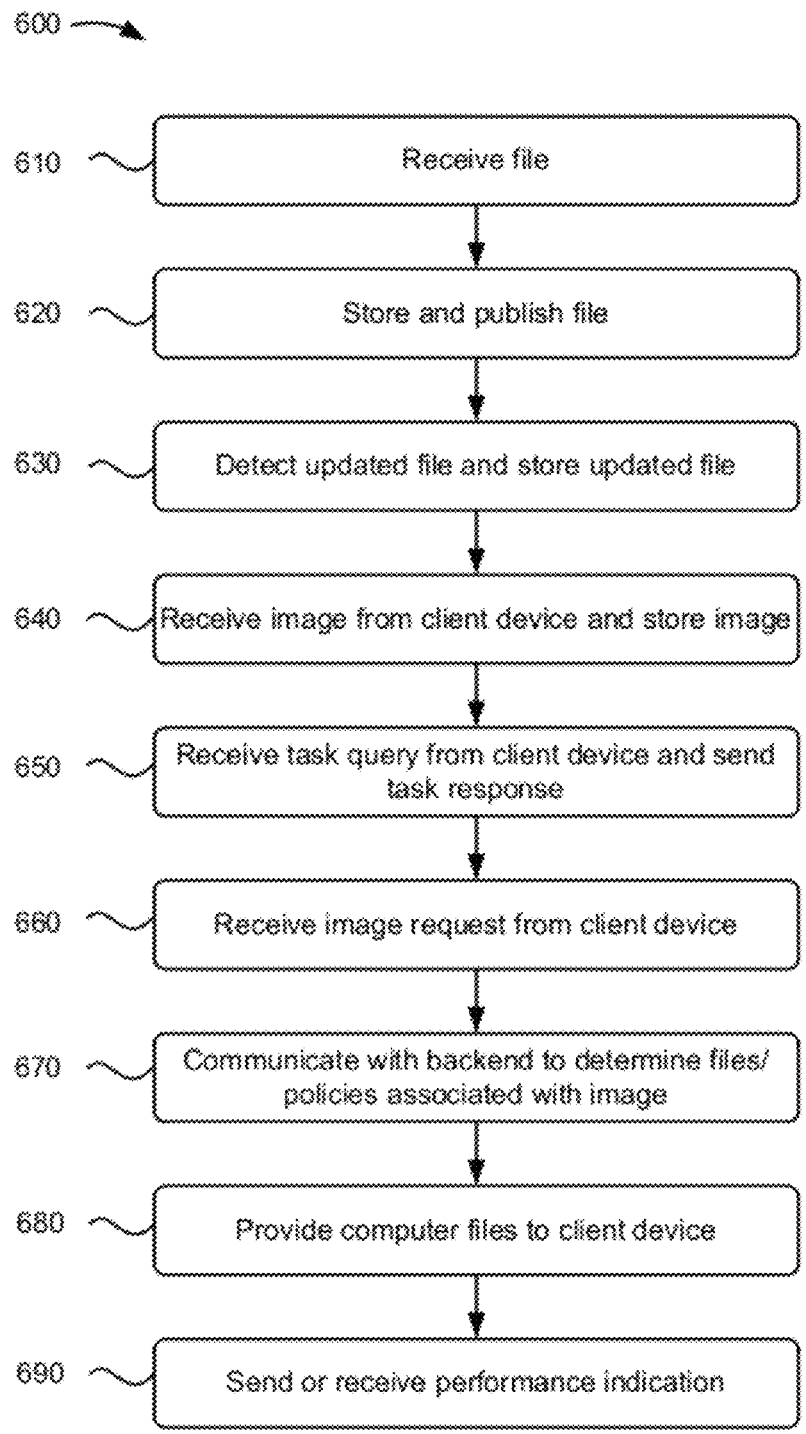
FIG. 6 illustrates a flowchart of an example process for storing files in a file repository, providing files to a client device, and providing server status.

FIG. 6 illustrates a flowchart of an example process 600 for storing files in a file repository, providing files to a client device, and providing server status. In one implementation, process 600 may be performed by one or more components of middle tier server 220, such as processor 310 of middle tier server 220. In another implementation, one or more blocks of process 600 may be performed by one or more components of another device (e.g., client device 210 or backend server 230), or a group of devices including or excluding middle tier server 220.

Process 600 may include receiving a file (block 610). For example, middle tier server 220 may receive a file from client device 210 and/or backend server 230 (e.g., middle tier server 220 may store the file in file repository 410 such that client device 210 may receive the file associated with an image or for some other purpose).

Process 600 may further include storing and publishing the file (block 620). For example, as described above with respect to file repository 410, middle tier server 220 may store the file based on identifying that the file is not currently being stored by middle tier server 220 or based on identifying that the file is being stored by file repository 410 but that the received file is more recent than the file being stored by middle tier server 220 (e.g., based on a version number, a hash value, a timestamp, etc.). In some implementations, middle tier server 220 may not store the received file when middle tier server 220 is currently storing a current version of the file. A first middle tier server 220 (e.g., middle tier server 220-1) may publish the file such that another middle tier server 220 in environment 200 (e.g., middle tier server 220-2) may detect that the file has been received by middle tier server 220-1. For example, middle tier server 220-1 may assign a file with a file identifier to indicate a published filed and may broadcast the file identifier such that middle tier server 220-2 may detect that the file has been received by middle tier server 220-1. Additionally, or alternatively, middle tier server 220-2 may detect that the file has been received by middle tier server 220-1 using some other technique.

Process 600 may further include detecting an updated file and storing the updated file (block 630). For example, a first middle tier server 220 (e.g., middle tier server 220-1) may communicate with a second middle tier server 220 (e.g., middle tier server 220-2) at regular intervals (e.g., at a 5, 10, 20, 30 second interval, or some other interval) to detect when middle tier server 220-2 receives and stores a file (e.g., a file that was not previously stored by middle tier server 220-1 or middle tier server 220-2 or an updated file of a file stored by middle tier server 220-1 or middle tier server 220-2). Middle tier server 220-1 may receive the file such that middle tier server 220-1 and middle tier server 220-2 each have the same up-to-date file. In some implementations, middle tier server 220-1 may delete an outdated file, associated with the updated file, based on receiving the updated file. Alternatively, middle tier server 220-1 may retain the outdated file when receiving and storing the updated file.

Process 600 may also include receiving an image from client device 210 and storing the image (block 640). For example, middle tier server 220 may receive an image from client device 210 when client device 210 receives an instruction to build the image (e.g., from a user via a user interface associated with client device 210). Further, middle tier server 220 may store a task, associated with the image, in task repository 430. As described above with respect to task repository 430, a master client device 210 (e.g., client device 210-1) may identify an image associated with a particular client device 210 (e.g., client device 210-2) within the same subnet of client device 210-1 based on images stored by middle tier server 220. Client device 210-2 may communicate with middle tier server 220 to receive the image based on task repository 430 providing an indication to client device 210-1 that task repository 430 is storing a task for an image associated with client device 210-2.

Process 600 may further include receiving a task query from client device 210 and sending a task response (block 650). For example, middle tier server 220 may receive a task query from a master client device 210 and may send a task response to the master client device 210 based on the task query. In some implementations, the task response may include information identifying an image, stored by middle tier server 220, associated with a client device 210 (e.g., client device 210-2) within the subnet of the client device 210-1. Client device 210-1 may notify client device 210-2 that middle tier server 220 is storing an image associated with client device 210-2 such that client device 210-2 may send an image request to middle tier server 220 to receive the image and/or files associated with the image.

Process 600 may also include receiving an image request from client device 210 (block 660). For example, middle tier server 220 may receive an image request from client device 210 (e.g., client device 210-2) based on client device 210-2 receiving an indication (e.g., from client device 210-1) that middle tier server 220 is storing an image associated with client device 210-2.

Process 600 may further include communicating with backend server 230 to determine files and/or policies associated with the image (block 670). For example, middle tier server 220 may communicate with backend server 230 to determine files and/or policies associated with the image. As described above, backend server 230 may store policies for an image, such as policies relating to installation procedures, policies to identify files associated with an image, and/or policies relating to some other information associated with the image.

Process 600 may further include providing files to client device 210 (block 680). For example, middle tier server 220 may provide files, associated with the image, to client device 210 based on determining the files associated with the image, as described above. Additionally, middle tier server 220 may provide the files to client device 210 in accordance with the policies associated with the image and stored by backend server 230 (e.g., policies relating to installation procedures for files, policies relating to from which middle tier server 220 may be used to provide the files to client device 210, etc.). In some impletions, middle tier server 220 may automatically provide the files to client device 210 (e.g., middle tier server 220 may "push" the files to client device 210 automatically) based on determining the files associated with the image. Alternatively, middle tier server 220 may provide the files to client device based on client device 210 requesting the files (e.g., client device 210 may "pull" the files from middle tier server 220). For example, client device 210 may request files, associated with the image, thereby reducing network activity of middle tier server 220 in relation to when middle tier server 220 pushes the files to client device 210.

Process 600 may also include receiving a performance indication (block 690). For example, as described above, a first middle tier server 220 (e.g., middle tier server 220-1) may function as a master middle tier server 220 for a second middle tier server 220 (e.g., middle tier server 220-2) or a group of middle tier servers 220. Middle tier server 220-1 may receive a performance indication from middle tier server 220-2 at regular intervals (e.g., at a 5, 10, 20, 30 second interval, or some other interval). In some implementations, the performance indication may include an indication that middle tier server 220-2 is performing properly with respect to a performance benchmark (e.g., a network latency benchmark, a network speed benchmark, and/or some other benchmark.). For example, middle tier server 220-2 may provide an indication to middle tier server 220-1, such as a ping check, or some other indication. Middle tier server 220-1 may automatically redirect network traffic from middle tier server 220-2 to a third middle tier server 220 (e.g., middle tier server 220-3) based on not receiving the performance indication from middle tier server 220-2.

While a particular series of blocks is described with respect to FIG. 6, it will be apparent that in practice, the order of the blocks may be modified while non-dependent blocks may be performed in parallel. For example, blocks 640-650 may be performed independently from and in parallel with blocks 610-630 and/or blocks 660-690. Additionally, or alternatively, blocks 610-620 may be performed independently from and in parallel with blocks 630-690. Additionally, or alternatively, block 630 may be performed independently from and in parallel with blocks 610-620 and 640-690. Additionally, or alternatively, block 690 may be performed independently from and in parallel with blocks 610-660. Additionally, or alternatively, blocks 660-680 may be performed independently from and in parallel with blocks 610-650 and block 690.

Figure 7:
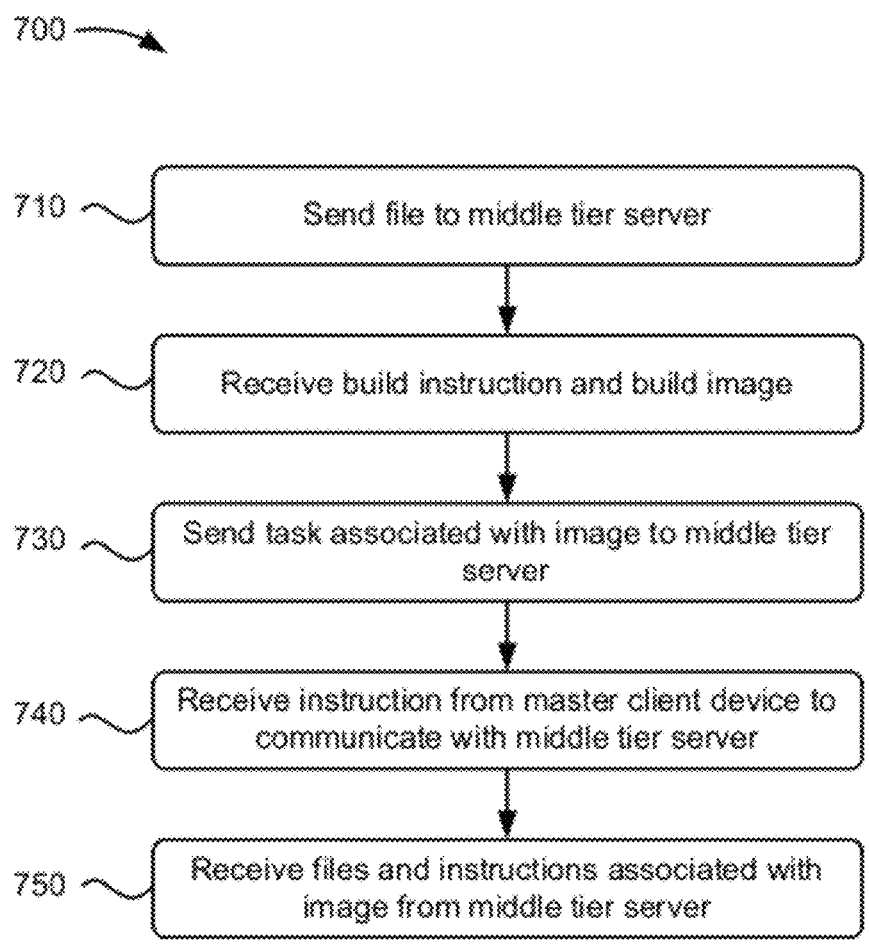
FIG. 7 illustrates a flowchart of an example process for building an image and processing instructions associated with the image.

FIG. 7 illustrates a flowchart of an example process for building an image and processing instructions associated with the image. In one implementation, process 700 may be performed by one or more components of client device 210, such as processor 310 of client device 210. In another implementation, one or more blocks of process 700 may be performed by one or more components of another device (e.g., middle tier server 220 or backend server 230), or a group of devices including or excluding client device 210.

Process 700 may include sending a file to middle tier server 220 (block 710). For example, as described above, client device 210 may provide a file to middle tier server 220 to allow middle tier server 220 to store the file in file repository 410 such that client device 210 (e.g., the client device 210 that provided the file or some other client device 210 in environment 200) may receive the file associated with an image or for some other purpose.

Process 700 may further include receiving a build instruction and building an image (block 720). For example, as described above, client device 210 may receive information to build an image, such as an image name, an image location, image contents, installation schedule, and/or some other information. In some implementations, client device 210 may receive the information via a web-based user interface, a software application, and/or via some other technique. Client device 210 may build the image based on the information to build an image, as described above.

Process 700 may also include sending a task, associated with the image, to middle tier server 220 (block 730). For example, client device 210 may send the task, associated with the image, to middle tier server 220 based on building the image, as described above.

Process 700 may further include receiving an instruction from a master client device 210 to communicate with middle tier server 220 (block 740). As described above, a first client device 210 may function as a master client device 210 (e.g., client device 210-1) for a second client device 210 (e.g., client device 210-2) or a group of client devices 210 within a collection, such as a subnet. Client device 210-1 may communicate with middle tier server 220 to identify images stored by middle tier server 220 associated with client device 210-2. Client device 210-2 may communicate with middle tier server 220 to receive the image based on receiving an indication from the client device 210-1 that middle tier server 220 is storing an image associated with client device 210-2.

Process 700 may also include receiving files and instructions associated with the image from middle tier server 220 (block 750). For example, client device 210 may receive files and instructions, associated with an image, based on communicating with middle tier server 220 as described above (e.g., when client device 210 receives an instruction from a master client device 210 to communicate with middle tier server 220).

While a particular series of blocks is described with respect to FIG. 7, it will be apparent that in practice, the order of the blocks may be modified while non-dependent blocks may be performed in parallel. For example, block 710 may be performed independently from and in parallel with blocks 720-750. Additionally, or alternatively, blocks 720-730 may be performed independently from and in parallel with blocks 710 and 740-750. Additionally, or alternatively, blocks 740-750 may be performed independently from and in parallel with blocks 710-730.

As described above, a first client device 210 (e.g., client device 210-1) may be used to build an image for a device in environment 200 (e.g., the client device 210 used to build the image or some other client device 210 in environment 200, such as client device 210-2) without client device 210-1 storing the files associated with the image. Also, client device 210-1 may build an image via a web-based interface without specific software. Additionally, client device 210-2 may receive the image, instructions and files, associated with the image, via middle tier server 220 and/or backend server 230. Further, the files are stored by a central repository, associated with the middle tier server 220, thereby ensuring that the files, associated with the image, are up to date.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
receiving, by a first server, an image from a first client device,
the image including an instruction to provide a second client device with a computer file;
storing, by the first server, the image based on receiving the image from the first client device;
receiving, by the first server, a task query from the first client device;
providing, by the first server, a task query response to the first client device based on receiving the task query,
the task query response including an indication that the first server is storing a task associated with the second client device, and
the second client device receiving the task query response from the first client device;
receiving, by the first server, an image request from the second client device based on the second client device receiving the task query response;
communicating, by the first server, with a second server to identify the computer file or policies associated with the image; and
providing, by the first server and to the second client device, the computer file associated with the image in accordance with the polices associated with the image.

2. The method of claim 1, further comprising:
communicating with the second server to identify whether the second client device is authorized to receive the image based on an identifier associated with the second client device,
where providing the computer file associated with the image is based on determining that the second client device is authorized to receive the image.

3. The method of claim 1, further comprising:
sending a performance indication to a third server,
the performance indication including information to identify whether the first server is properly providing the computer file associated with the image with respect to a performance benchmark.

4. The method of claim 1, further comprising:
receiving the computer file from a third client device;
determining that the computer file is already stored by the first server;
determining that the computer file, stored by the first server, is not up to date with respect to the computer file received from the third client device; and
storing the computer file received from the third client device based on determining that the computer file, stored by the first server, is not up to date with respect to the computer file received from the third client device.

5. The method of claim 1, further comprising:
communicating with a third server to receive the computer file based on identifying that the third server stores the computer file; and
storing the computer file received from the third server.

6. A system comprising:
a first server to:
  receive an image from a first client device,
    the image including an instruction to provide a second client device with a computer file;
  store the image based on receiving the image from the first client device;
  receive a task query from the first client device;
  provide a task query response to the first client device based on receiving the task query,
    the task query response including an indication that the first server is storing a task associated with the second client device, and
    the second client device receiving the task query response from the first client device;
  receive an image request from the second client device based on the second client device receiving the task query response;
  communicate with a second server to identify whether the second client device is authorized to receive the image;
  communicate with the second server to identify the computer file or policies associated with the image; and
  provide, to the second client device, the computer file associated with the image in accordance with the polices associated with the image and based on identifying that the second client device is authorized to receive the image.

7. The system of claim 6, where the first server is further to:
send a performance indication to a third server,
  the performance indication including information to identify whether the first server is properly providing the computer file associated with the image with respect to a performance benchmark.

8. The system of claim 6, where the first server is further to:
receive the computer file from a third client device;
determine that the computer file is already stored by the first server;
determine that the computer file, stored by the first server, is not up to date with respect to the computer file received from the third client device; and
store the computer file received from the third client device based on determining that the computer file, stored by the first server, is not up to date with respect to the computer file received from the third client device.

9. The system of claim 6, where the first server is further to:
identify that a third server stores the computer file based on communicating with the third server at regular intervals;
communicate with the third server to receive the computer file based on identifying that the third server storing the computer file; and
store the computer filed received from the third server.

10. A non-transitory computer-readable medium storing instructions, the instructions comprising:
a plurality of instructions, which, when executed by one or more processors associated with a first server, cause the one or more processors to:
  receive an image from a first client device,
    the image including an instruction to provide a second client device with a computer file;
  store the image based on receiving the image from the first client device;
  receive a task query from the first client device;
  provide a task query response to the first client device based on receiving the task query,
    the task query response including an indication that the first server is storing a task associated with the second client device, and
    the second client device receiving the task query response from the first client device;
  receive an image request from the second client device based on the second client device receiving the task query response;
  communicate with a second server to identify computer file or policies associated with the image; and
  provide, to the second client device, the computer file associated with the image in accordance with the polices associated with the image.

11. The non-transitory computer-readable medium of claim 10,
where the instructions further comprise:
  one or more instructions, which, when executed by the one or more processors, cause the one or more processors to:
    communicate with the second server to identify whether the second client device is authorized to receive the image, and
  where one or more instructions, of the plurality of instructions, to provide the computer file associated with the image include:
    one or more instructions, which, when executed by the one or more processors, cause the one or more processors to:
      provide the computer file associated with the image based on determining that the second client device is authorized to receive the image.

12. The non-transitory computer-readable medium of claim 10, where the instructions further comprise:
one or more instructions, which, when executed by the one or more processors, cause the one or more processors to:
  send a performance indication to a third server,
    the performance indication including information to identify whether the first server is properly providing the computer file associated with the image with respect to a performance benchmark.

13. The non-transitory computer-readable medium of claim 10, where the instructions further comprise:
one or more instructions, which, when executed by the one or more processors, cause the one or more processors to:
  receive the computer file from a third client device;
  determine that the computer file is already stored by the first server;
  determine that the computer file, stored by the first server, is not up to date with respect to the computer file received from the third client device; and
  store the computer file received from the third client device based on determining that the computer file stored by the first server is not up to date with respect to the computer file received from the third client device.

14. The non-transitory computer-readable medium of claim 10, where the instructions further comprise:
one or more instructions, which, when executed by the one or more processors, cause the one or more processors to:
  identify that a third server stores the computer file based on communicating with the third server at regular intervals;
  communicate with the third server to receive the computer file based on identifying that the third server storing the computer file; and
  store the computer filed received from the third server.

15. A method comprising:
receiving, by a first client device, an instruction to generate a first image,
the first image including an instruction to provide the first client device or a second client device with a first computer file;
generating, by the first client device, the first image based on the instruction to generate the first image;
sending, by the first client device, the first image to a server based on generating the first image;
sending, by the first client device, an image request to the server; and
receiving, by the first client device and from the server, a second computer file associated with a second image based on sending the image request to the server.

16. The method of claim 15, further comprising:
sending a third computer file to the server,
the server storing the third computer file based on determining that the third computer file is not currently being stored by the server or based on determining that server is storing an older version of the third computer file.

17. The method of claim 15, where the first image includes the instruction to provide the first client device or the second client device with the first computer file based on the first client device being authorized to generate an image associated with the first computer file.

18. The method of claim 15, further comprising:
receiving an instruction from a third client device to communicate with the server,
the third client device sending the instruction based on sending a task query to the server and receiving a task response from the server to identify that the server is storing an image associated with the first client device,
where sending the image request to the server is based on receiving the instruction from the third client device to communicate with the server.

19. The method of claim 15, further comprising:
sending a task query to the server;
receiving a task response from the server,
the task response identifying that the server is storing an image associated with a third client device; and
sending an instruction to the third client device to communicate with the server to receive a computer file associated with the image.

20. A system comprising:
a first client device to:
receive an instruction to generate a first image,
the first image including an instruction to provide the first client device or a second client device with a first computer file based on the first client device being authorized to generate an image associated with the first computer file;
generate the first image based on the instruction to generate the first image;
send the first image to a server based on generating the first image;
send an image request to the server; and
receive, from the server, a second computer file associated with a second image based on sending the image request to the server.

21. The system of claim 20, where the first client device is further to:
send a third computer file to the server,
the server storing the third computer file based on determining that the third computer file is not currently being stored by the server or based on determining that server is storing an older version of the third computer file.

22. The system of claim 20,
where the first client device is further to:
receive an instruction from a third client device to communicate with the server,
the third client device sending the instruction based on sending a task query to the server and receiving a task response from the server to identify that the server is storing an image associated with the first client device, and
where, when sending the image request to the server, the first client device is to:
send the image request to the server based on receiving the instruction from the third client device to communicate with the server.

23. The system of claim 20, where the first client device is further to:
send a task query to the server;
receive a task response from the server,
the task response identifying that the server is storing an image associated with a third client device; and
send an instruction to the third client device to communicate with the server to receive a computer file associated with the image.

* * * * *